(12) United States Patent
Fiedler (10) Patent No.: US 9,224,087 B2
(45) Date of Patent: Dec. 29, 2015

(54) SECURE IDENTIFICATION OF A PRODUCT (75) Inventor: Michael Fiedler, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 13/390,464

(22) PCT Filed: Aug. 13, 2010

(86) PCT No.: PCT/EP2010/061857
§ 371 (c)(1),
(2), (4) Date: Feb. 14, 2012

(87) PCT Pub. No.: WO2011/018523
PCT Pub. Date: Feb. 17, 2011

(65) Prior Publication Data
US 2012/0141660 A1  Jun. 7, 2012

(30) Foreign Application Priority Data

Aug. 14, 2009  (DE) .................. 10 2009 037 626

(51) Int. Cl.
B41M 3/14      (2006.01)
B44F 1/12      (2006.01)
G06K 19/14     (2006.01)
G06K 7/14      (2006.01)
G06K 19/06     (2006.01)

(52) U.S. Cl.
CPC .............. *G06K 19/14* (2013.01); *G06K 7/1434* (2013.01); *G06K 19/06018* (2013.01); *G06K 19/06037* (2013.01); *G06K 19/06046* (2013.01); *G06K 19/06056* (2013.01)

(58) Field of Classification Search
CPC ... G06Q 50/00; G06Q 99/00; G06Q 2220/00; H04L 9/32; G09F 3/00; B41M 3/14
USPC .............................................. 427/7
See application file for complete search history.

(56) References Cited

U.S. PATENT DOCUMENTS

| 7,025,269 | B2  | 4/2006  | Marshall |
| 2001/0046294 | A1 | 11/2001 | Bandy et al. |
| 2004/0151880 | A1* | 8/2004  | Nakamura et al. ......... 428/195.1 |
| 2005/0047593 | A1 | 3/2005  | Hampp |
| 2006/0040726 | A1* | 2/2006  | Szrek et al. .................... 463/17 |
| 2008/0185438 | A1 | 8/2008  | Pinchen et al. |

(Continued)

FOREIGN PATENT DOCUMENTS

| BG | 61241 B1 | 3/1997 |
| BG | 63518 B1 | 3/2002 |

(Continued)

OTHER PUBLICATIONS

International Search Report in corresponding PCT Application No. PCT/EP2010/061857 dated Nov. 19, 2010.

(Continued)

*Primary Examiner* — Kelly M Gambetta
(74) *Attorney, Agent, or Firm* — Workman Nydegger (57) ABSTRACT In a method for marking a product first a product identification (12) is generated (S1) and applied (S5) onto the product (21). Subsequently the product identification (26) applied onto the product (21) is captured (S6) and stored (S8, S9) in a product database (11). Here in particular also an independent authentication feature (22) is designated (S3, S5) and applied (S6) together with the product identification (26) onto the product (21) and stored (S8, S9) in the product database (11).

17 Claims, 3 Drawing Sheets

(56) References Cited

U.S. PATENT DOCUMENTS

| | | |
|---|---|---|
| 2008/0219503 A1 | 9/2008 | Di Venuto et al. |
| 2009/0057408 A1 | 3/2009 | Abraham |
| 2009/0146409 A1* | 6/2009 | Lesur ............................ 283/73 |
| 2009/0284802 A1* | 11/2009 | Yeap et al. .................. 358/3.28 |
| 2011/0096955 A1* | 4/2011 | Voloshynovskiy et al. ... 382/103 |
| 2011/0259962 A1 | 10/2011 | Picard et al. |

FOREIGN PATENT DOCUMENTS

| | | |
|---|---|---|
| DE | 69514004 T2 | 4/2000 |
| DE | 10155780 A1 | 5/2003 |
| DE | 10162537 A1 | 9/2003 |
| EP | 1485862 B1 | 12/2004 |
| EP | 1959403 A2 * | 8/2008 |
| FR | 2936335 A1 | 3/2010 |
| WO | 2007/028799 A1 | 3/2007 |

OTHER PUBLICATIONS

European Search Report from Application No. 10 742 826.0, Jul. 8, 2014.

* cited by examiner

SECURE IDENTIFICATION OF A PRODUCT

BACKGROUND OF THE INVENTION

A. Field of the Invention

The present invention relates to a method for marking a product as well as a corresponding marking apparatus.

B. Related Art

Usually products are equipped within the framework of the manufacturing process with a unique product marking or product identification serving later verification and/or tracking of the product, since it can allow conclusions as to the place and date of manufacture, channels of delivery and export, distributors or the like. For this purpose product identifications in the form of unique digital encodings can be used, for example sequences of digits or characters, one-dimensional or two-dimensional bar codes, data matrix codes or the like. Such unique product identifications are frequently generated in advance, separately from the product manufacturing process itself, and are attached to the product in question only later. So as to ensure that the product identification can be read out and used for a later verification of a product in circulation, the product identification applied onto the product is read out again shortly after the marking and stored in a product database as reference for a later verification of the product in question.

Such a marking method, however, requires the trustworthiness of all components and parties involved, since the product identifications are generally not counterfeit-proof. Actually currently both valid product identifications can be stolen and brought into circulation with counterfeit products, and counterfeit product identifications can be introduced into the marking process and applied onto genuine products, without this being noticed.

In this context WO 2007/028799 A1 suggests using the randomness of microscopic surface structures in that suitable micro-structure features of the product material are designated through relatively sophisticated image processing and used as unique product identifications. The verification and tracking of the product in question then requires an equally sophisticated microscopic analysis of the surface structure of the product to be respectively verified, so as to reproduce the feature with the highest possible quality.

Further DE 695 14 004 T2 suggests a method for certifying facsimile copies against the associated original document, in which the original document is analyzed line by line or grid by grid before the facsimile transmission and a bar code is applied onto the facsimile copy from which the content of the original document (comparable to a cryptographic signature of an e-mail message) can be reconstructed at least partly.

Consequently it is the object of the present invention to suggest a marking of a product which allows a verification of the product with the greatest possible efficiency at the greatest possible counterfeit-proofness.

SUMMARY OF THE DISCLOSURE

When marking a previously manufactured product a unique product identification is generated and applied onto the product. Subsequently the applied product identification is captured again and stored in a product database as product identification of the product brought into circulation. According to the invention also an independent authentication feature is designated which allows the later authenticity verification of the product identification in question and thereby of the product. The designated independent authentication feature is applied onto the product together with the product identification and also stored in the product database together with the product identification.

Preferably the marking of a product according to the invention is carried out by a marking apparatus comprising a marking device which applies the unique product identification together with the independent authentication feature onto a manufactured product, and comprising a capturing device which captures at least the product identification applied onto the product. Further the marking apparatus comprises a control device which on the one hand receives the product identification to be applied onto the product from a central device and designates the authentication feature and transfers it to the marking device for application onto the product.

In connection with the present invention a "unique product identification" is to be understood as an alphanumeric or other encoding, e.g. a bar code of a unique serial number of the product which uniquely marks the product and makes it identifiable, since it was/is not assigned to any other product. In contrast, an "independent authentication feature" is to be understood as a marking referring to the product identification, which sufficiently individualizes the product in question, but does not necessarily have to be unique in the above sense. In particular the independent authentication feature, apart from a verifiable specification regarding the authenticity of the product identification, does not comprise any further product-specific or other essential information otherwise related to the product, e.g. regarding product properties, its life cycle, place of manufacture, manufacturing method or manufacturing date, a manufacturing apparatus used or the like. Accordingly the authentication feature is generated separately, independently of such product- and manufacture-specific information, or designated in the product identification, which allows a counterfeiter to draw conclusions regarding the authentication feature and can thus compromise the counterfeit-proofness of the product identification. In particular, besides its separate generation, an authentication feature can also be established as an image artifact that is already present in the product identification applied onto the product, provided that this image artifact is the result of chance and not due to systematic causes upon the product marking.

The authentication feature allows a check of the product identification for authenticity, since it is uniquely linked with the product identification via the product database and it can thus be verified in a product that is in circulation and marked according to the invention whether the product identification is present on the product together with the correct authentication feature or, if this is not the case, whether a counterfeit is present. It is impossible to smuggle a counterfeit product identification into the product database or to use counterfeit product identifications, since counterfeit product identifications have not run through the process of designating an independent authentication feature and of common application and storage together with the product identification, and are insofar not registered correctly in the product database. Likewise the theft of a genuine product identification for marking a counterfeit product is prevented, since a stolen product identification on a counterfeit product has not run through the process of designating an authentication feature and common application and storage either.

Since the marking apparatus that applies the product identification onto the product together with the authentication feature is controlled by the product manufacturer, the invention also ensures that a product identification stored in the product database was actually applied onto a genuine product together with the associated authentication feature within the framework of a manufacturing process. Correspondingly the marking apparatus is preferably integrated in a larger manufacturing apparatus or manufacturing plant of the product manufacturer and is connected via the control device with a central device, from which it receives the unique product identification. The central device preferably comprises the product database, so that the control device forwards the authentication feature and the product identification captured by the capturing device to the central device for storing in the product database.

Preferably the authentication feature is designated by the control device in such a fashion that it is in particular independent of the marking process and the marking apparatus or its control device, marking device and capturing device. This means that there is no information in the authentication feature which concerns or encodes (in plain text) any technical features, elements or other characteristic properties of the marking apparatus, e.g. characteristic printed image artifacts of the marking device or characteristic artifacts in digital images captured by the capturing device. Moreover, the authentication feature can also be designated in such a fashion that it is independent of a manufacturing process or of the manufacturing apparatus and manufacturing plants involved and is insofar much more counterfeit-proof than such features which can be derived from technical properties or other properties related to the product marking or product manufacturing, since according to the invention there are presently no indications of a counterfeit. Preferably this independence is achieved through using random processes in generating the authentication feature. Additionally an independent authentication feature can also be generated independently, for example by a further instance which is unrelated to the product manufacturing and marking.

Since the product identification is stored in the product database in that form in which it was applied onto the product and captured by the product, the authentication feature is thus stored as reference authentication feature in the concrete form captured by the product, and not for example in the abstract prototypical or parameterized form of the mathematical operations with which it was originally designated. Thereby the later verifiability of a captured comparative authentication feature against the reference authentication feature stored in the database increases, since upon the verification it need not be checked directly whether the comparative authentication feature was generated with the same mathematical operations with which also the reference authentication feature was generated, but—much simpler—it can be checked directly whether the comparative authentication feature and the stored reference authentication feature (essentially) match. In the same fashion also the product identification applied onto the product together with the authentication feature can be captured as comparative product identification and verified against the stored reference product identification.

The authentication feature is preferably both applied onto the product together with the product identification by the marking device and captured together with the product identification of the product by the capturing device, forwarded to the control device and forwarded by the latter together with the product identification to the central device for storing in the product database. The authentication feature thus is preferably applied, captured and stored in the same process step as or at least in close temporal relation to the product identification.

Herein the authentication feature is applied onto the product so that it is linked with the product identification in such a fashion that it cannot be derived from a (n unauthorized) copy of the applied product identification. The authentication feature applied onto the product together with the product identification is designed in such a fashion that it is made sufficiently unrecognizable or irreproducible or unverifiable through copying. This can be achieved e.g. through such a design of the authentication feature that it e.g. disappears in the obligatory detector noise of a copying machine. A product identification copied in this fashion with a largely unrecognizable authentication feature cannot be verified as genuine against the reference product information stored together with the reference authentication feature.

Preferably the authentication feature is linked with the product feature so closely that it is visually indistinguishable from the product identification for a viewer. Since the viewer thus does not know the authentication feature (or even about its presence), the authentication feature cannot be counterfeited with technical means without any problem. Thereby the counterfeit-proofness of the authentication feature is further increased, since it cannot be identified on the product and portioned from a product identification by a potential counterfeiter. Thus, for lack of knowledge of the authentication feature, a counterfeiter cannot either optimize a copying process with regard to copying the authentication feature as exactly as possible.

Simultaneously an as tight as possible linking of the product identification and the authentication feature offers a further increase in security, since neither the product identification nor the authentication feature can be manipulated separately from, independently of the respectively other. This can be achieved for example through storing a common product data set in which the captured product identification and the associated reference authentication feature are included in a fashion that is not recognizable separately for third parties, e.g. in an encrypted or otherwise scrambled and irreversible form.

Preferably as marking device a printing apparatus or reproduction apparatus is used, for example an ink-jet printer, laser printer or the like, which prints the generated product identification either directly onto the product or its outer packaging or on a label which is subsequently applied in an as far as possible irreversible fashion onto the product through gluing, tacking or the like. Correspondingly as capturing device preferably a scanning device is used, for example a scanner or a camera, which digitally scans the product identification (preferably together with the authentication feature) applied onto the product, and transfers it in the form of an integrated product data set to the product database via the control device. Here the product identification is preferably a unique encoding, for example a unique sequence of characters or symbols, a one-dimensional or two-dimensional bar code, a data matrix code or the like, which is stored in the product database as product identification in the captured graphic form or as a broken-up sequence of characters or symbols.

While the product identification and the authentication feature can in principle be applied onto the product in any desired design, it is preferred to provide the product identification in the form of a printed image and to integrate its authentication feature as an artifact into the printed image. The resulting printed image with artifact is then applied onto the product by the print or reproduction apparatus and digitally captured by the capturing or scanning apparatus and stored in the product database. Such an authentication feature as (local or global) artifact of a printed image can for example be an authentication feature synthetically generated exclusively for this purpose, which in particular is not due to production parameters, apparatus parameters or technical properties of the reproduction device or of the reproduction process, but which was designated in an as uniformly distributed fashion as possible by means of a random generator.

The authentication feature can thus for example be a random but concrete noise deviation and/or a random but concrete contrast deviation or color deviation, which is added to the product identification and thus locally manipulates intensities, contrasts and/or colors of the printed image of the product identification. Here the concrete local (pixelwise) intensity, contrast and/or color deviations against the original product identification form the authentication feature and not the (prototypical or abstract) parameters of those statistical distributions on which the concrete noise, contrast and/or color deviations are based. Here the distribution parameters can be chosen in such a fashion that the concrete noise, contrast and/or color deviations can be reproduced upon a renewed capturing of the product identification for the purpose of verification, but that a (n unauthorized) copying changes these concrete noise, contrast and/or color deviations through an additional noise process of the respective copying apparatus in such a fashion that they are no longer suitable as sufficiently exact comparative authentication feature. In principle any desired linear and non-linear image processing operators and filters can be used to generate the authentication feature, provided that they fulfill the above-mentioned conditions.

Likewise synthetic distortions, deformations and/or tiltings of the printed image of the product identification are conceivable or also translations, rotations, scalings or other affine transformations of the product identification relative to the product or its outer packaging. For example a small offset and/or a slight rotation relative to the standard printing position of a product identification on the product can be used as authentication feature. Such local or global transformations can be implemented in a combined fashion, so as to obtain correspondingly more complex authentication features.

Preferably merely a suitable portion is selected from the product identification captured together with the authentication feature and stored in the database as reference product identification, so as to economize storage space and computing time. This portion is then selected from the captured product identification in such a fashion that from it the authentication feature can be derived as reference authentication feature with sufficient exactness, so that a comparative authentication feature derived in the course of the product cycle can be verified against the reference authentication feature based on this portion. However, alternatively also the complete product identification can be captured and stored together with the authentication feature in the product database and merely a suitable portion of the stored product identification can be defined from which the authentication feature can be derived as reference authentication feature with sufficient exactness. In the course of the product cycle a comparative authentication feature is then determined for the purpose of verification, which can be verified against the stored reference authentication feature resulting from the defined portion, e.g. since it is derived exactly from the corresponding portion of the comparative product identification.

In either case a definition of the portion in question is stored in the product database in addition to the reference product identification and the reference authentication feature, e.g. its coordinates, so that upon the later determination of a comparative authentication feature exactly the portion of a comparative product identification can be taken into account from which the reference authentication feature was already derived.

Preferably the marking of the product and the capturing of the applied product identification together with the authentication feature is carried out within the framework of a manufacturing process of the product or of its outer packaging or of accompanying documents of the product in question, which are also to bear the product identification. Herein the product identification is generated preferably in a centralized fashion and separately from the manufacturing process and the marking apparatus, through a central device which preferably also comprises the product database. Provided that the central device and the manufacturing apparatus or marking apparatus are separate units and are disposed in different locations, they are in data communication with each other via a (as far as possible secured) data communication network, for example for transmitting the generated product identification from the central device to the marking device, and of the captured product identification and of the designated authentication feature from the capturing device to the central device or its product database.

BRIEF DESCRIPTION OF THE DRAWINGS

Further features and advantages of the invention will result from the following description of embodiments according to the invention and further alternative embodiments in connection with the accompanying drawings. The figures are described as follows.

DETAILED DESCRIPTION OF PREFERRED EMBODIMENTS OF THE INVENTION

Figure 1:
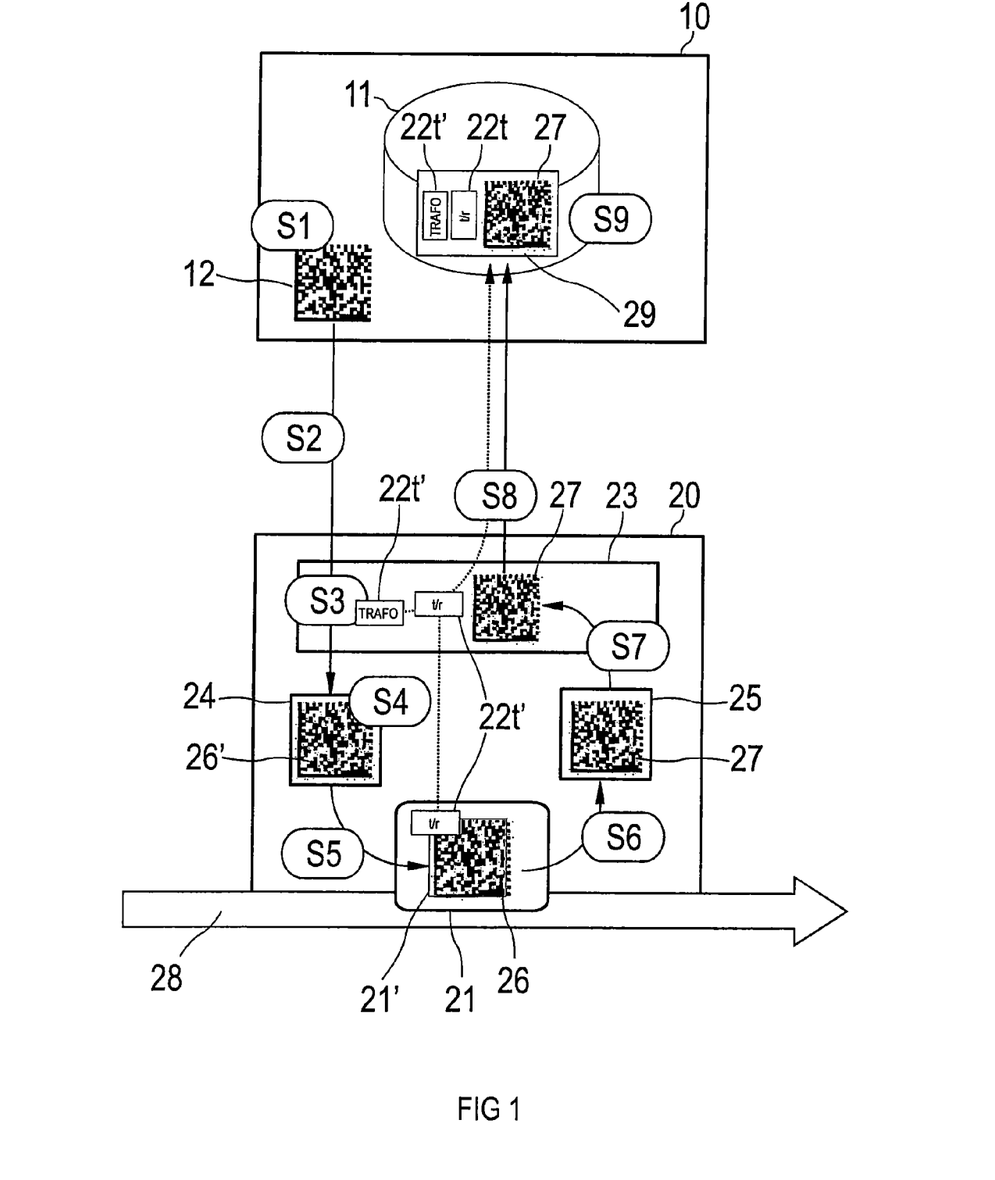
FIG. 1 An embodiment of an arrangement and a method for marking products.
Figure 2:
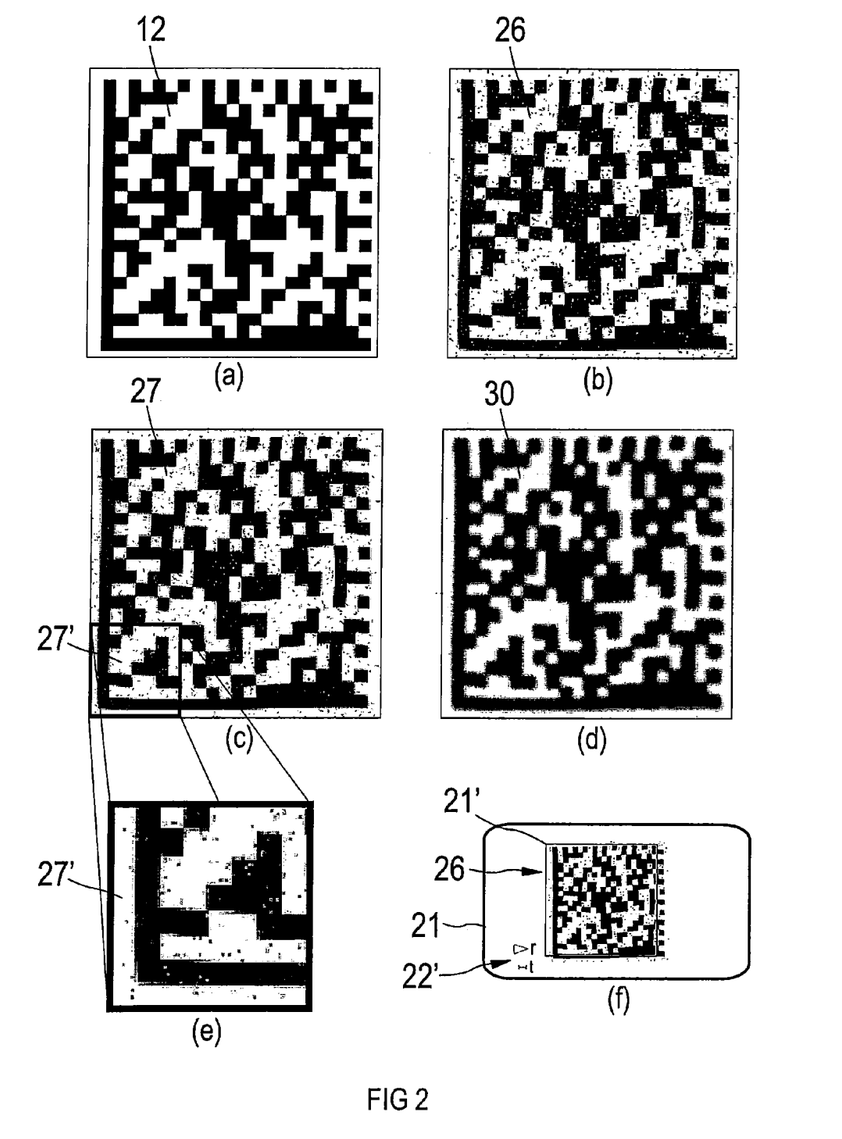
FIG. 2 an example of a product identification with authentication feature.
Figure 3:
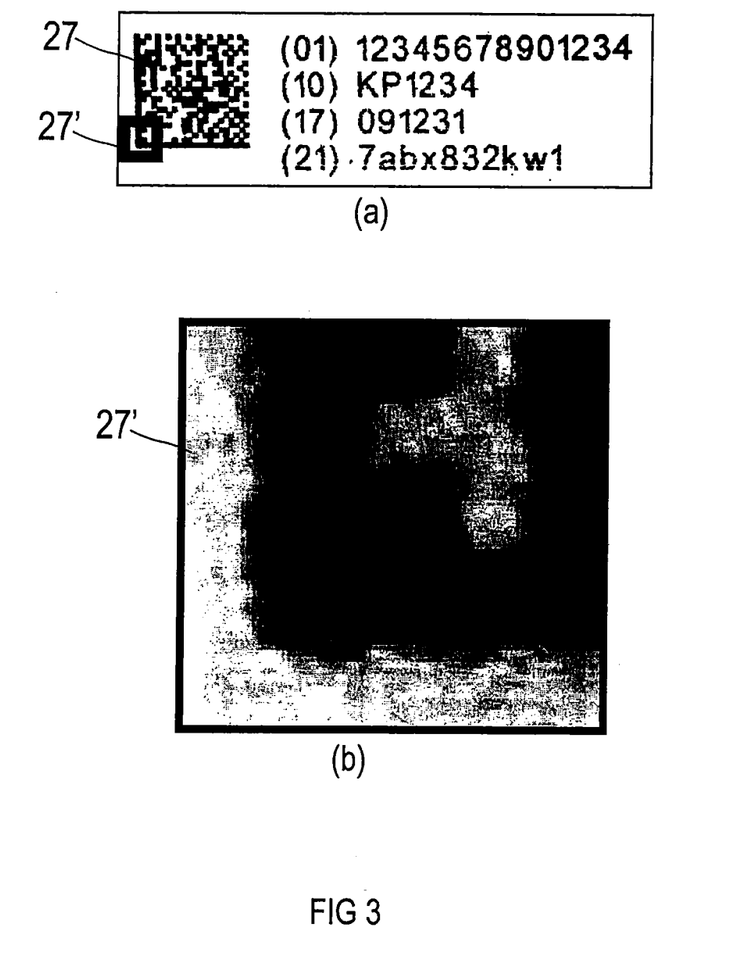
FIG. 3 a further example of a product identification with authentication feature.

FIG. 1 outlines an arrangement for marking products 21, consisting of a central device 10 as well as a marking apparatus 20, which can enter into data communication with each other via suitable data communication interfaces and a data communication network. The central device 10 essentially comprises a product database 11 for storing product-specific data, in particular product data sets 29, which comprise at least a product identification 27 uniquely allocated to the respective product 21 as well as an independent authentication feature 22 related to it. The authentication feature 22 can be used in this product data set 29 both in the form of separate transformation data $22t'$, $22t$ that were used for generating the authentication feature 22 and—preferably—linked intrinsically with the transformed product identification 27. The FIGS. 2 and 3 show examples for product identifications 12 in the form of a data matrix code (two-dimensional bar code) and their further processing stages 26, 27, 27', 30 and manipulations within the framework of the marking method outlined in FIG. 1.

The marking device 20 comprises at least a control device 23, a marking device 24, as well as a capturing device 25, which carry out a marking of the product 21 and its registration in the product database 11 within the framework of its manufacturing process 28. Both the central unit 10 and the marking apparatus 20 comprise the usual components and hardware and software units required for their operation, for example processors, bus systems, storage devices and the like. Such conventional components are mentioned hereinafter only on condition that they are important for the present invention. In this context at least the control device 23 of the marking apparatus 20 can be designed as a conventional computer device, which itself comprises all required components to be able on the one hand to enter into data communication with the central unit 10 and on the other hand to carry out a data acquisition and a data exchange with the marking device 24 and the capturing device 25. Herein the marking device 24 can be designed as a reproduction or printing apparatus and the capturing device 25 as a scanning apparatus or sensing apparatus with preferably particularly high resolution.

The marking device 20 can form part of a larger manufacturing apparatus (not shown), and as such can be integrated in a suitable fashion into a manufacturing process 28, in the course of which a product 21 is first manufactured, then marked by the marking apparatus 20 and finally packaged and prepared for issue to the end customer. Of course the marking apparatus 20 can also be integrated in any other desired place in a manufacturing process 28 and, if applicable, can interact and/or be meshed in any desired fashion with further devices required in the manufacture of the product 21. The marking apparatus 20 is represented largely isolated from further manufacturing steps and manufacturing devices merely for the sake of clarity.

For marking the product 21 in step S1 first a unique product identification 12 is generated by the central device 10, for example by a suitable code generator or the like. This product identification 12 can in principle be any desired digitally readable, unique marking of the product 21, for example a sequence of figures or characters or a graphic code, such as for example a bar code, a data matrix code or the like, which encodes e.g. a batch number or serial number of the product 21. In step S2 the generated product identification 12 is digitally transmitted via a suitable data communication connection to the control device 23 of the marking apparatus 20, which controls the subsequent process of marking (steps S3 to S5) and registering (steps S6 to S9) of the product 21 in the product database 11.

In step S3 the control device 23 links an independent authentication feature 22 with the product identification 12 so as to apply them together onto the product 21 subsequently. The independent authentication feature 22 here is made available first in the form of transformation data $22t'$ (TRAFO), which, upon implementation on the product identification 12 present in the form of a digital image (that is upon transformation of the product identification 12 according to the transformation data $22t'$ as transformation parameters), result in a transformed product identification 26' which comprises the authentication feature 22 defined by the transformation data $22t'$ and the product identification 12 in such a form that they cannot be separated without any problem. The independent authentication feature 22 then corresponds exactly to the difference of the transformed product identification 26' relative to the originally generated, untransformed product identification 12. The transformation data $22t'$ thus form an abstract transformation rule, according to which the concrete authentication feature 22 is integrated into the product identification 12. Provided that the abstract transformation data $22t'$ comprise a random component, e.g. a random variable as parameter of a statistical distribution of a noise process, a concrete authentication feature 22 in the form of a concrete noise pattern results, which is linked (additively or multiplicatively) with the digital product identification 12.

The transformation data $22t'$ here are selected in such a fashion that an authentication feature 22 results which is at least independent of the marking apparatus 20 or its reproduction apparatus 24 and/or the scanning apparatus 25, so as to prevent possible conclusions regarding the authentication feature 22 on the basis of knowledge about the marking apparatus 20. Moreover, the authentication feature 22 can also be independent of the complete manufacturing process 28 or of further circumstances and properties dependent on the manufacturer or the product, so that corresponding knowledge cannot be used for counterfeiting the authentication feature 22 either. In particular, as far as possible no further essential product-specific information or information otherwise related to the product manufacturer or the product 21 and its manufacture whatsoever, such as e.g. data, the product properties, product life cycles, manufacturing locations, manufacturing methods, manufacturing data, manufacturing apparatus or the like, is considered in the generation of the independent authentication feature 22 other than such information concerning its function as authentication feature 22.

Insofar the transformation data $22t'$ concern any desired, synthetically generated image transformations which can be generated also independently of the location of product manufacture or product marking. In particular also a random component is considered in the transformation data $22t'$, so as to enhance the independence of the authentication feature 22. In particular also local or global changes in contrast or color components or any desired digital filters and operators can be used as transformations forming an authentication feature 22. For example the FIGS. 2a and 2b show a digitally generated, ideal product identification 12 and a transformed product identification 26 generated on the basis of transformation data $22t'$, in which the authentication feature 22 consists of a combination of an impulse noise (cf. pixel artifacts in FIG. 2b) and an area-wise geometric transformation expressing itself in the form of ton-shaped or cushion-shaped local deformations. As an alternative to the transformation-based, synthetic generation of an authentication feature 22 as shown in FIG. 1 the authentication feature 22, as illustrated in FIG. 3, can also be derived exclusively from a noise-induced or other image impairment that already results from the printing and/or subsequent scanning of the digitally generated product identification. The detail of FIG. 3b clearly shows the effect of such noise or image-impairment processes and their suitability as reproducible authentication feature. Moreover, as authentication feature 22 also a random and recognizable image artifact that is already present can be established in the printed product identification 26, provided that it is not due to characteristic properties of the marking apparatus 20, such as e.g. to a systematic and reproducible artifact due to a defect reproduction or scanning apparatus 24, 25.

The transformed product identification 26' generated in step S3 is subsequently printed in step S4 by the reproduction apparatus 24, e.g. in the form of a label or the like to be applied onto the product 21. The reproduction apparatus 24 can for example be any desired printer working according to any desired printing method, for example a laser printer or the like. In particular the reproduction apparatus 24 can also be a device for generating embossed, optically variable structures or other security elements that can be used as unique product identification, for example an intaglio printing device, an embossing device or the like.

In step S5 the transformed product identification 26' reproduced by the reproduction apparatus 24 is applied onto the product 21 or its outer packaging as far as possible in such a fashion that the product identification 26' cannot be removed, exchanged or manipulated without destroying the product 21. In step S5 besides the transformation data $22t'$ defining local/area-wise image transformations a further global transformation (or affine transformation) defined through transformation data $22t$ can be implemented, in that the transformed product identification 26' is applied e.g. with a slight offset t or a slight rotation r relative to an area 21' of the product 21, which is routinely provided for applying a product identification and is of course not specified on the product 21. This becomes clear e.g. by means of FIG. 2f, in which the transformed product identification 26' was offset relative to the predetermined position 21' by the distance t and rotated by the angle r so as to obtain the applied, transformed product identification 26, which now comprises an authentication feature 22 that was created through a local/area-wise transformation 22t' (step S3) as well as a global, affine transformation 22t (t/r).

The transformed product identification 26 applied onto the product 21 is subsequently captured again by the scanning apparatus 25 in step S6 as a digital, scanned product identification 27 for the purpose of registration of the product 21 in the product database 11. The scanning apparatus 25 here can be e.g. a digital scanner, a digital camera or the like, which produces a digital image 27 of the product identification 26 with as high a quality and as high a resolution as possible, from which the authentication feature 22 can be reproduced as well as possible.

The process of applying the product identification 26 onto the product 21 in step S5 and of subsequently capturing the applied product identification 27 in step S6 as well as storing the captured (and not the applied) product identification 27 as reference data set 29 in the product database 11 serves for the as optimal as possible later verification of the product identification 26 applied onto the product 21 in circulation. Said identification must also be captured digitally then, so as to be comparable to the reference data set 29. The capturing of the product identification 27 in step S6 usually results in a minor image impairment of the captured product identification 27 relative to the applied product identification 26, as can be recognized by comparing FIGS. 2b and 2c. However, here a scanning apparatus 25 of such high quality is to be provided that the authentication feature 22 can still be derived from the captured product identification 27 (cf. FIG. 2c). To be able nevertheless to verify comparative product identifications that were captured later with their comparative authentication features against a reference data set 29 in the product database 11, it is not the originally generated product identification 12 that is stored together with the transformation data 22t', 22t in the product database 11, but merely the captured, transformed product identification 27 from which the corresponding authentication feature 22 can be gathered clearly.

In step S7 the captured product identification 27 is transmitted by the scanning apparatus 25 to the control device 23, so that in step S8 said control device prepares the data set 27, 22t', 22t to be stored in the product database 11 and transfers it to the central device 10. As already suggested before herein also exclusively the captured product identification 27 can be transmitted to the central device 10, provided that the authentication feature 22 can be gathered from it with sufficient exactness. However, in the case that the product data set 29 comprises the transformation data 22t', 22t, a plausibility check of the stored product identification 27 can be carried out, in that it is checked whether the authentication feature 22 can be a consequence of the present transformation data 22t', 22t at all.

Based on such security considerations or if e.g. the transformation data 22t, i.e. offset and rotation t/r, cannot be gathered with sufficient exactness from the captured product identification 27, e.g. because merely the product identification 27 and not a larger portion of the product 21 was captured from which the offset and the rotation relative to the area 21' could be derived, the transformation data 22t' (TRAFO) and/or 22t (t/r) can be stored in the product data base 11 in addition to the product identification 27. Depending on the transformations chosen for generating the authentication feature 22, this can make possible an exact verification of a product 21 in circulation.

In step S8 the control device 23 links the product identification 27 and possible transformation data 22t', 22t of the product 21 in question to form a product data set 29, so as to establish a verifiable connection between a certain product 21 (via its product identification 27) and the associated authentication feature 22. Subsequently the product data set 29 is transmitted to the central device 10 or its product database 11 and stored there in step S9, meaning that the product 21 is now properly registered and verifiable.

Through the intrinsic link between the authentication feature 22 (designed independently and as far as possible randomly) with the product identification 12 in the form of the stored product identification 27 it is ensured that conclusions regarding the authentication feature 22 are impossible, since the authentication feature is on the one hand independent of any possible features of the product or its manufacture and on the other hand a concrete authentication feature 22 is present in the form of a concrete implementation of the transformations 22t', 22t in the product identification 27—and not only for example the abstract transformation rules 22t', 22t. Insofar the product identification 27 could not be counterfeited even if the abstract transformation data 22t', 22t were present, for due to the random components (e.g. in noise processes such as the impulse noise in FIG. 2b) the concrete authentication feature 22 (that is e.g. the exact positions and intensities of the impulses in FIG. 2b) are irreproducible on the basis of the transformation 22t'. Thereby both the authenticity of the product 21 and the authenticity of the product identification 27 can be ensured, so that both equipping a counterfeited product with a stolen, genuine product identification 12 (since no corresponding product data set 29 with authentication feature 22 is present) and also equipping a genuine product 21 with a smuggled in, counterfeited product identification can be ruled out.

Nor can the applied product identification 27 be counterfeited through copying or scanning and printing, since the authentication feature 22 or the transformation 22t', 22t are designed in such a fashion that the product identification 27 cannot be copied with the exactness required for an as unaltered as possible maintenance of the authentication feature 22. This is shown for example in FIG. 2d, which represents a copy 30 of the applied, transformed product identification 27, from which at least the impulse noise and the ton-shaped/cushion-shaped local distortions cannot be derived with such exactness from the comparative authentication feature that a verification against the stored product identification 27 and the intrinsic authentication feature 22 is guaranteed.

When the product data set 29 is generated and stored with the steps S8 and S9 it must be ensured for security reasons that a link or meshing of the product identification 27 and the authentication feature 22 is present, so that from an emerging product data set 29 neither the product identification 12 (thus without the authentication feature 22) nor the authentication feature 22 can be gathered separately. This is guaranteed in any case when the product data set 29 contains only the transformed product identification 27 and not the transformation data 22t', 22t in addition. On the other hand the transformation data 22t', 22t, as already mentioned above, can be used for a plausibility check of the product identification 27, in that it checked whether the stored transformation data 22t', 22t correspond to the authentication feature 22. Thereby the smuggling in of counterfeit product identifications 27 and/or counterfeit authentication features 22 can be ruled out.

As an alternative to capturing and storing the product identification 27 with the authentication feature 22 e.g. the control device 23 in step S8, as shown in FIG. 2e and FIG. 3, can chose merely a representative portion 27' from the captured product identification 27 and store only said portion in the product data base 11 for the purpose of economizing memory space and computing time. On the other hand the complete product identification 27 can be continued to be stored, so as to ensure its verification, and a portion 27' can be defined, so that at least the comparison operation within the framework of a verification is sped up. In every case additional coordinate data (not shown) must be stored in the product database 11, which specify or define the selected portion 27' and make it possible to choose the same portion from a printed product identification 26 of a product 21 in circulation for the purpose of verification.

The portion 27' here is to be selected from the transformed product identification 27 in such a fashion that the authentication feature 22 can be derived from it with sufficient exactness, so as to pass the comparison of the stored portion 27' of the reference product identification 27 with a corresponding portion from a comparative product identification 26 taken from the same product 21. For example the portion 27' can be established by means of striking parts of the authentication feature 22, e.g. a particularly clear noise impulse or image artifact. When such a portion of a comparative product identification 26 is captured on the one hand merely the corresponding portion can be captured with the aid of the stored portion definition, or first the complete comparative product identification 26 can be captured so as to extract the portion from it subsequently. Moreover, it is also possible to choose the portion in a varying fashion, so as to use an individual portion in every verification.

The invention claimed is:

1. A method for marking a manufactured product, the method comprising the steps:
   generating a product identification corresponding to the product;
   performing an image transformation of the product identification based on a designated authentication feature to obtain a transformed product identification;
   performing an affine transformation of the transformed product identification to obtain a globally transformed product identification;
   applying the globally transformed product identification onto the product;
   capturing an image of at least a portion of the globally transformed product identification corresponding to the product to obtain captured product identification; and
   storing the captured product identification in a product database wherein the authentication feature is applied onto the product together with the product identification in such a fashion that the authentication feature cannot be derived from a copy of the applied product identification.

2. The method according to claim 1, wherein the authentication feature is designated independently of a marking device applying the product identification onto the product.

3. The method according to claim 1, wherein the authentication feature is designated independently of a manufacturing process and/or of a manufacturing apparatus according to which or by which the product was generated.

4. The method according to claim 1, wherein the authentication feature is designated randomly.

5. The method according to claim 1, wherein the authentication feature is applied by a marking device together with the product identification onto the product.

6. The method according to claim 1, wherein the authentication feature is applied onto the product in such a fashion together with the product identification that it cannot be distinguished visually from the applied product identification.

7. The method according to claim 1, wherein the product identification is linked with the authentication feature in such a fashion that neither the product identification nor the authentication feature can be manipulated separately.

8. The method according to claim 1, wherein the product identification is applied onto the product as a printed image, and the authentication feature as an artifact of the printed image and a reproduction of the printed image with artifact is captured and stored at least partly in the database.

9. The method according to claim 1, wherein the authentication feature is applied onto the product in such a fashion together with the product identification as comparative authentication feature and stored as reference authentication feature in the product database that the comparative authentication feature can be derived from the product and verified against the reference authentication feature.

10. The method according to claim 9, wherein the authentication feature is captured together with the product identification, and the captured authentication feature is stored as reference authentication feature in the product database.

11. The method according to claim 9, wherein the product identification captured together with the authentication feature a portion is defined, from which the authentication feature can be derived with such exactness that a comparative feature derived from the product is verifiable against the stored reference feature and the product identification is stored in the database together with the portion definition.

12. The method according to claim 1, wherein
   the product identification is linked with at least one of an individual noise deviation, an individual contrast deviation, a color deviation, an individual distortion, deformation, tilting, an individual translation, and rotation relative to the product as the authentication feature applied onto the product.

13. The method according to claim 1, further comprising linking the captured product identification with transformation data of the designated authentication feature to obtain a product data set.

14. The method according to claim 1, further comprising verifying the authenticity of the produced based on the captured product identification.

15. The method according to claim 1, wherein capturing at least a portion of the transformed produced identification includes obtaining an image of at least a portion of the globally transformed product identification.

16. The method according to claim 1, wherein the authentication feature includes an image transformation of the product identification.

17. The method according to claim 1, wherein the affine transformation includes offsetting or rotating the transformed product identification relative to an area of the product when applying the transformed product identification.

* * * * *